(12) United States Patent
Chang et al.

(10) Patent No.: US 12,455,440 B2
(45) Date of Patent: Oct. 28, 2025

(54) SIGHT DEVICE

(71) Applicants: Sintai Optical (Shenzhen) Co., Ltd., ShenZhen (CN); Asia Optical Co., Inc., Taichung (TW)

(72) Inventors: Ken Chiakan Chang, Taichung (TW); Tung-Ching Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 457 days.

(21) Appl. No.: 18/058,894

(22) Filed: Nov. 28, 2022

(65) Prior Publication Data
US 2023/0184514 A1    Jun. 15, 2023

(30) Foreign Application Priority Data

Dec. 15, 2021 (CN) .......................... 202111532662.X

(51) Int. Cl.
| | |
|---|---|
| G02B 23/10 | (2006.01) |
| F41G 1/38 | (2006.01) |
| F41G 1/473 | (2006.01) |
| F41G 3/06 | (2006.01) |
| G02B 23/14 | (2006.01) |

(52) U.S. Cl.
CPC .............. G02B 23/10 (2013.01); F41G 1/38 (2013.01); F41G 1/473 (2013.01); F41G 3/065 (2013.01); G02B 23/14 (2013.01)

(58) Field of Classification Search
None
See application file for complete search history.

(56) References Cited

U.S. PATENT DOCUMENTS

| | | | |
|---|---|---|---|
| 10,145,652 B2 | 12/2018 | Paterson et al. | |
| 2005/0219690 A1 | 10/2005 | Lin et al. | |
| 2006/0254115 A1* | 11/2006 | Thomas | F41G 1/38 42/122 |
| 2009/0223107 A1* | 9/2009 | Lin | G02B 23/04 42/115 |
| 2013/0199074 A1* | 8/2013 | Paterson | F41G 1/38 42/122 |
| 2017/0191796 A1 | 7/2017 | Scroggins | |

FOREIGN PATENT DOCUMENTS

| | | |
|---|---|---|
| CN | 107632297 A | 1/2018 |
| TW | 200533884 A | 10/2005 |
| TW | 201738526 A | 11/2017 |

\* cited by examiner

*Primary Examiner* — Shan Liu
(74) *Attorney, Agent, or Firm* — McClure, Qualey & Rodack, LLP

(57) ABSTRACT

In a sight device, an objective lens unit is disposed at an end of a housing. An ocular lens unit is disposed at another end of the housing and opposite to the objective lens unit. An erector unit is disposed between the objective lens unit and the ocular lens unit. A adjusting unit is movably disposed on the housing and radially propped against the erector unit to adjust the erector unit. A light emitting unit is disposed on the erector unit and includes a light source for emitting a light beam to an object. A light receiving unit is disposed on the erector unit and includes a light sensor for receiving the light beam reflected by the object. In any cross section of the housing, any point on the external surface of the housing is approximately equally distant from the second central axis.

14 Claims, 4 Drawing Sheets

SIGHT DEVICE

BACKGROUND OF THE INVENTION

Field of the Invention

The invention relates to a sight device, and more particularly to a sight device that is normally sized and is capable of range finding.

Description of the Related Art

A normal type of sight is not provided with range finding function. For a sight provided with range finding function, it generally has an individual shape in appearance (determined in accordance with the design) and therefore requires a special holding element to be mounted on a firearm. Generally, a sight provided with range finding function cannot be mounted onto a firearm by means of a normal holding element.

BRIEF SUMMARY OF THE INVENTION

An object of the invention is to provide a sight device. The sight device is provided with range finding function, has an external shape and dimensions like a normal sight, and can be mounted onto a firearm by means of a normal holding element.

The sight device in accordance with an exemplary embodiment of the invention includes a housing, an objective lens unit, an ocular lens unit, an erector unit, an adjusting unit, a light emitting unit and a light receiving unit. The housing includes a first end, a second end opposite to the first end, an external surface and a second central axis. The objective lens unit is disposed at the first end of the housing. The ocular lens unit is disposed at the second end of the housing and opposite to the objective lens unit. The erector unit is disposed between the objective lens unit and the ocular lens unit. The adjusting unit is movably disposed on the housing and radially propped against the erector unit to adjust the erector unit. The light emitting unit is disposed on the erector unit and includes a light source for emitting a light beam to an object. The light receiving unit is disposed on the erector unit and includes a light sensor for receiving the light beam reflected by the object. In any cross section of the housing, any point on the external surface of the housing is approximately equally distant from the second central axis.

In another exemplary embodiment, the housing further includes a first held portion and a second held portion which are disposed at both sides of a location where the adjusting unit is connected to the housing. The first held portion and the second held portion are hollow and cylindrical. A ratio of a length of the first held portion to that of the second held portion is ranged from 0.5 to 2.

In yet another exemplary embodiment, the housing further includes an internal surface. In any cross section of the housing, any point on the internal surface of the housing is approximately equally distant from the second central axis.

In another exemplary embodiment, the sight device includes a housing, an objective lens unit, an ocular lens unit, an erector unit, an adjusting unit, a light emitting unit, and a light receiving unit. The housing includes a first end, a second end opposite to the first end, an internal surface and a second central axis. The objective lens unit is disposed at the first end of the housing. The ocular lens unit is disposed at the second end of the housing and opposite to the objective lens unit. The erector unit is disposed between the objective lens unit and the ocular lens unit. The adjusting unit is movably disposed on the housing and radially propped against the erector unit to adjust the erector unit. The light emitting unit is disposed on the erector unit and includes a light source for emitting a light beam to an object. The light receiving unit is disposed on the erector unit and includes a light sensor for receiving the light beam reflected by the object. In any cross section of the housing, any point on the internal surface of the housing is approximately equally distant from the second central axis.

In yet another exemplary embodiment, the housing further includes a first held portion and a second held portion which are disposed at both sides of a location where the adjusting unit is connected to the housing. The first held portion and the second held portion are hollow and cylindrical. A ratio of a length of the first held portion to that of the second held portion is ranged from 0.5 to 2.

In another exemplary embodiment, the housing further includes a first held portion. The erector unit includes a first central axis. The light emitting unit further includes a first end surface disposed towards the objective lens unit. The first end surface includes a plurality of points among which a first reference point is disposed farthest from the first central axis. The light receiving unit further includes a second end surface disposed towards the objective lens unit. The second end surface includes an outer edge and a middle point of the outer edge is a second reference point. The first held portion is hollow and cylindrical and includes an inner diameter and an outer diameter. The sight device satisfies at least one of following conditions: $6 \leq D5/g3 \leq 13$, $8 \leq D6/g2 \leq 14$, $4\% \leq |(D5-D6)/d1| \leq 6\%$, $4\% \leq |(D5-D6)/d2| \leq 6\%$, where D5 is a distance from the second reference point to the first central axis, g3 is a minimum distance from the light receiving unit to the first held portion, D6 is a distance from the first reference point to the first central axis, g2 is a minimum distance from the light emitting unit to the first held portion, d1 is the inner diameter of the first held portion, and d2 is the outer diameter of the first held portion.

In yet another exemplary embodiment, the erector unit includes a first central axis. When observed along the first central axis, the light source and the light sensor coincide with each other.

In another exemplary embodiment, the erector unit includes a first central axis. When observed along the first central axis, the light source and the light sensor are arranged to have an included angle of 180° with respect to the first central axis.

In yet another exemplary embodiment, the erector unit includes a first prism and a second prism. The first prism is disposed closer to the objective lens unit than the second prism.

In another exemplary embodiment, the erector unit further includes a first central axis. The first prism includes a first side surface disposed towards the ocular lens unit, and a second side surface disposed towards the objective lens unit. The second prism includes a third side surface disposed towards the ocular lens unit, and a fourth side surface disposed towards the objective lens unit. The light emitting unit includes a first end surface disposed towards the objective lens unit. The light receiving unit includes a second end surface disposed towards the ocular lens unit. The first central axis intersects the second side surface at a first intersection and intersects the third side surface at a second intersection. The first end surface includes a plurality of points among which a first reference point is disposed farthest from the first central axis. The second end surface includes an outer edge and an inner edge disposed closer to the erector unit than the outer edge. A middle point of the outer edge is a second reference point. The sight device satisfies at least one of following conditions: $0.8 \leq |(D1-D2)/(D3-D4)| \leq 3$, $0.2 \leq |(A1-A2)/(A3-A4)| \leq 0.6$, where D1 is a distance between the first end surface and the third side surface, D2 is a distance between the second end surface and the third side surface, D3 is a distance between the first side surface and the third side surface, D4 is a distance between the second side surface and the third side surface, A1 is an angle at which a first line connecting the second reference point and the second intersection meets the first central axis, A2 is an angle at which a second line connecting the first reference point and the second intersection meets the first central axis, A3 is an angle at which a third line connecting the second reference point and the first intersection meets the first central axis, and A4 is an angle at which a fourth line connecting the first reference point and the first intersection.

In yet another exemplary embodiment, the erector unit includes a first prism. The first prism is disposed closer to the objective lens unit than the light emitting unit.

In another exemplary embodiment, the housing further includes a first held portion. The first held portion is hollow and cylindrical and includes an inner diameter and an outer diameter. The sight device satisfies at least one of following conditions: $3\% \leq g1/d1 \leq 6\%$, $3\% \leq g1/d2 \leq 6\%$, $2\% \leq g2/d1 \leq 5\%$, $2\% \leq g2/d2 \leq 5\%$, $2\% \leq g3/d1 \leq 6\%$, $2\% \leq g3/d2 \leq 5\%$, where g1 is a minimum distance between the first prism and the first held portion, d1 is the inner diameter of the first held portion, d2 is the outer diameter of the first held portion, g2 is a minimum distance between the light emitting unit and the first held portion, and g3 is a minimum distance between the light receiving unit and the first held portion.

In yet another exemplary embodiment, the housing further includes a first held portion and a second held portion which are disposed at both sides of a location where the adjusting unit is connected to the housing. The first held portion and the second held portion are hollow and cylindrical. The first held portion includes a first inner diameter and a first outer diameter. The second portion includes a second inner diameter and a second outer diameter. A ratio of the first inner diameter of the first held portion to the second inner diameter of the second held portion is ranged from 0.95 to 1.05. A ratio of the first outer diameter of the first held portion to the second outer diameter of the second held portion is ranged from 0.95 to 1.05.

A detailed description is given in the following embodiments with reference to the accompanying drawings.

DETAILED DESCRIPTION OF THE INVENTION

Figure 1:
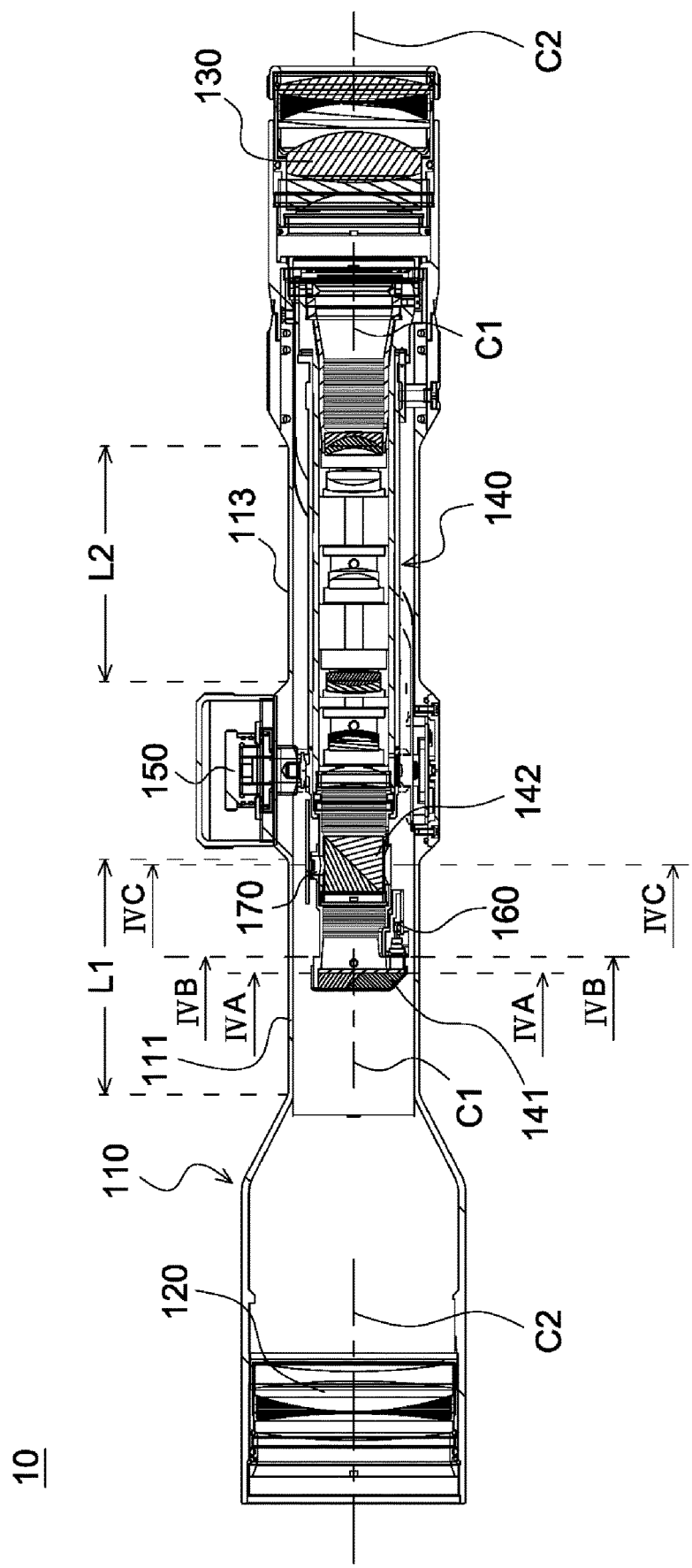
FIG. 1 is a schematic diagram of a sight device in accordance with the invention.

Referring to FIG. 1, FIG. 1 is a schematic diagram of a sight device in accordance with the invention. A sight device 10 of the invention includes a housing 110. The housing 110 has an objective lens unit 120 disposed at an end and an ocular lens unit 130 disposed at the other end and opposite to the objective lens unit 120. An erector unit 140 is disposed between the objective lens unit 120 and the ocular lens unit 130. The erector unit 140 has an end disposed closer to the objective lens unit 120 that is a free end, and another end disposed closer to the ocular lens unit 130 that is connected to a movable coupling (not shown) in the housing. Thus, the erector unit 140 under an external force can change the attitude thereof with respect to the movable coupling. The sight device 10 further includes an adjusting unit 150 that is radially penetrated through the housing 110 and propped against the erector unit 140. In operation, the sight device 10 is directed at an object (not shown) and the image light of the object propagates through the objective lens unit 120, the erector unit 140 and the ocular lens unit 130 to user's eye, facilitating the user to aim at the object. Then, the user can use the adjusting unit 150 to adjust the attitude of the erector unit 140 for compensating the bullet impact point.

Figure 2:
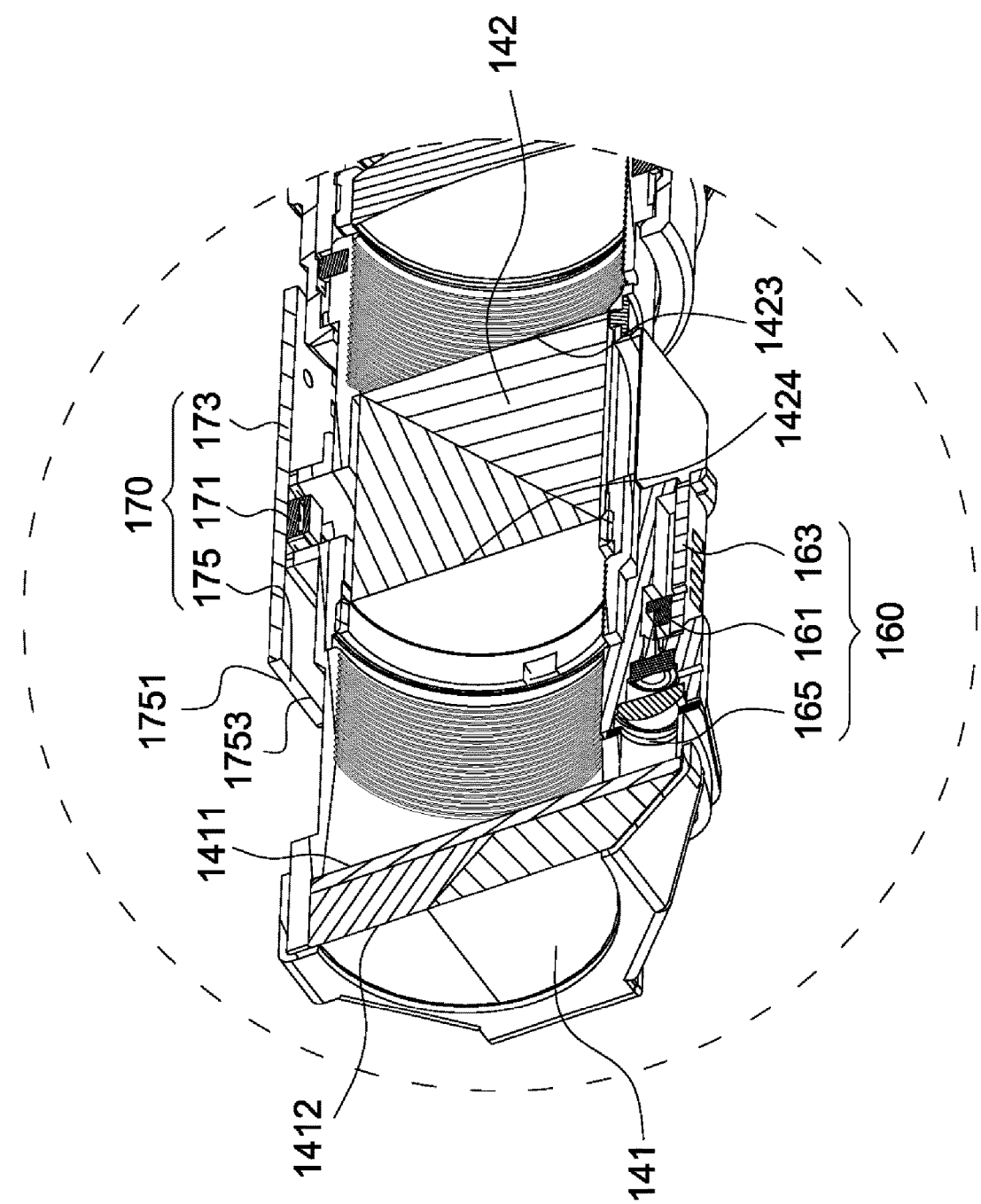
FIG. 2 is a section view of a part of the erector unit in accordance with the invention.

The sight device 10 of the invention has not only the sighting function but the range finding function. Therefore, the sight device 10 further includes a light emitting unit 160 and a light receiving unit 170, both of which are connected to the erector unit 140. Referring to FIG. 2, FIG. 2 is a section view of a part of the erector unit in accordance with the invention. The light emitting unit 160 includes a light source 161, for example, laser diode (LD), disposed on a circuit board 163 by surface mount technology (SMT). The light receiving unit 170 includes a light sensor 171, for example, avalanche photodiode (APD), disposed on a circuit board 173 by SMT. Thanks to SMT, the light emitting unit 160 and the light receiving unit 170 has significantly reduced volumes to be disposed in the housing. That is, the sight device 10 can have an external shape and dimensions like a normal sight. Therefore, designing a special shape of the sight device 10 or enlarging the sight device 10 for containing the light emitting unit 160 and the light receiving unit 170 is not required. Further, the sight device 10 can be mounted onto a firearm through a normal holding element. In this embodiment, both the light emitting unit 160 and the light receiving unit 170 are SMT elements. However, it also belongs to the category of the invention if only one of the light emitting unit 160 and the light receiving unit 170 is a SMT element.

The sight device 10 of the invention further includes a first prism 141 and a second prism 142 disposed in the erector unit 140, wherein the first prism 141 is closer to the objective lens unit 120 than the second prism 142. During range finding operation, a light beam is emitted by the light source 161, passes through the first prism 141 and the objective lens unit 120, reaches an object (not shown), is reflected by the object back to the sight device 10, passes through the objective lens unit 120, the first prism 141 and the second prism 142 thereby changing the propagating direction, and reaches the light sensor 171. Then, the distance of the object can be obtained for user's reference by using the time difference between when the light beam is emitted and when the light beam is received.

The structure of the sight device 10 of the invention is described in detail in the following:

Referring back to FIG. 1, the housing 110 includes a first held portion 111 and a second held portion 113. The first held portion 111 and the second held portion 113 are hollow and substantially cylindrical and are respectively disposed at two opposite sides of a location where the adjusting unit 150 is connected to the housing. A length L1 of the first held portion 111 is at least 30 mm. A length L2 of the second held portion 113 is at least 30 mm. In this embodiment, the ratio of the length L1 to the length L2 is 0.5 or 2. In the invention, however, the ratio of the length L1 to the length L2 is ranged from 0.5 to 2. By means of the first held portion 111 and the second held portion 113 described above, the sight device 10 of the invention can be mounted onto a firearm through a normal holding element. Further, the adjusting unit 150 is disposed close to the user that facilitates the user to operate the adjusting unit 150.

The erector unit 140 has a first central axis C1. The housing 110 has a second central axis C2. As described above, the user can use the adjusting unit 150 to adjust the attitude of the erector unit 140 for compensating the bullet impact point. Before the adjustment, the included angle between the first central axis C1 and the second central axis C2 may be, for example, 0°. During the adjustment, the included angle between the first central axis C1 and the second central axis C2 is changed. When the sight device 10 is observed along the second central axis C2, the maximum included angles between the first central axis C1 and the second central axis C2 at the top (0°), the bottom (180°), the left (270°), and the right (90°) are all 0.48. Under consideration of 5% tolerance, the maximum included angle in the invention is ranged from 0.456° to 0.504°. In other words, the maximum included angle between the first central axis C1 and the second central axis C2 in a vertical direction or in a horizontal direction is ranged from 0.456° to 0.504°. Further, the maximum included angles between the first central axis C1 and the second central axis C2 at the top right (45°), the bottom right (135°), the top left (315°), and the bottom right (225°) are all 0.68. Under consideration of 5% tolerance, the maximum included angle in the invention is ranged from 0.646° to 0.714°. In other words, the maximum included angle between the first central axis and the second central axis in a direction of inclination of 45°, 135°, 225° or 315° is ranged from 0.646° to 0.714°. The housing 110 has an external surface and an internal surface. In any cross section of the housing 110, any point on the external surface or the internal surface is approximately equally distant from the second central axis C2. It corresponds to the design that the first held portion 111 and the second held portion 113 are hollow and substantially cylindrical. The inner diameter of the first held portion 111 is approximately equal to that of the second held portion 113. The outer diameter of the first held portion 111 is approximately equal to that of the second held portion 113. Under consideration of 5% tolerance, the ratio of the inner diameter of the first held portion 111 to that of the second held portion 113 is ranged from 0.95% to 1.05%, and the ratio of the outer diameter of the first held portion 111 to that of the second held portion 113 is ranged from 0.95% to 1.05%.

During the adjustment of the attitude of the erector unit 140 by the adjusting unit 150, the minimum dimension of the gap between the erector unit 140 and the inner wall of the housing 110 at the top (0°), the bottom (180°), the left (270°), and the right (90°) are all 1 mm. Under consideration of 5% tolerance, the minimum dimension of the gap in the invention is ranged from 0.95 mm to 1.05 mm. In other words, the minimum dimension of the gap between the erector unit 140 and the housing 110 in a vertical direction or in a horizontal direction is ranged from 0.95 mm to 1.05 mm. Further, the minimum dimension of the gap between the erector unit 140 and the inner wall of the housing 110 at the top right (45°), the bottom right (135°), the top left (315°), and the bottom right (225°) are all 1.42 mm. Under consideration of 5% tolerance, the minimum dimension of the gap in the invention is ranged from 1.349 mm to 1.491 mm. In other words, the minimum dimension of the gap between the erector unit 140 and the housing 110 in a direction of inclination of 45°, 135°, 225° or 315° is ranged from 1.349 mm to 1.491 mm.

When the sight device 10 is observed along the first central axis C1, the light source 161 and the light sensor 171 are arranged to have an included angle of 180° with respect to the first central axis C1. Because the light source 161 and the light sensor 171 are not disposed adjacent to each other, the light sensor 171 can be avoided from accidently receiving the leaked light that is emitted by the light source 161 to affect the range finding operation. However, the invention is not limited thereto. It is understood that in the invention the positions of the light source 161 and/or the light sensor 171 can be changed. For example, when the sight device 10 is observed along the first central axis C1, the light source 161 and the light sensor 171 can coincide with each other (i.e. having an included angle of 0°). Such arrangement also belongs to the category of the invention.

Figure 3:
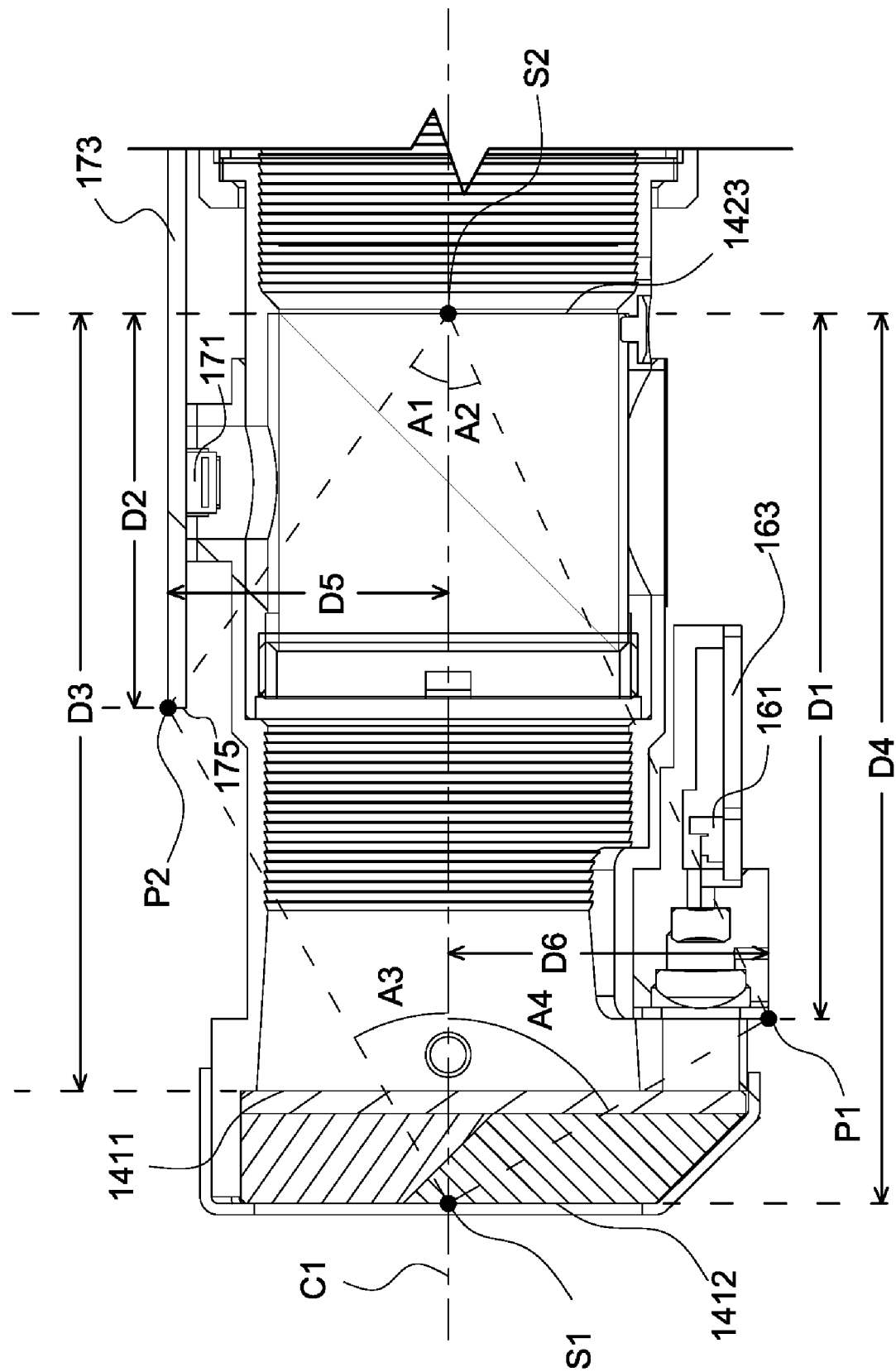
FIG. 3 is a front view of the erector unit of FIG. 2.

Referring to FIGS. 2 and 3, FIG. 3 is a front view of the erector unit of FIG. 2. The first prism 141 includes a first side surface 1411 disposed towards the ocular lens unit 130, and a second side surface 1412 disposed towards the objective lens unit 120. The second prism 142 includes a third side surface 1423 disposed towards the ocular lens unit 130, and a fourth side surface 1424 disposed towards the objective lens unit 120. The light emitting unit 160 includes a first end surface 165 disposed towards the objective lens unit 120. The light receiving unit 170 includes a second end surface 175 disposed towards the objective lens unit 120. A distance D1 between the first end surface 165 and the third side surface 1423 is ranged from 24.8 mm to 31.3 mm. Under consideration of 5% tolerance, the distance D1 is ranged from 23.56 mm to 32.865 mm. A distance D2 between the second end surface 175 and the third side surface 1423 is ranged from 13.1 mm to 17.5 mm. Under consideration of 5% tolerance, the distance D2 is ranged from 12.445 mm to 18.375 mm. A distance D3 between the first side surface 1411 and the third side surface 1423 is ranged from 34.5 mm to 38.5 mm. Under consideration of 5% tolerance, the distance D3 is ranged from 32.775 mm to 40.425 mm. A distance D4 between the second side surface 1412 and the third side surface 1423 is ranged from 39.5 mm to 45.5 mm. Under consideration of 5% tolerance, the distance D4 is ranged from 37.525 mm to 47.775 mm.

The first central axis C1 intersects the second side surface 1412 at a first intersection S1 and intersects the third side surface 1423 at a second intersection S2. On the first end surface 165, there is a first reference point P1 disposed farthest from the first central axis C1. In the invention, a distance D6 from the first reference point P1 to the first central axis C1 is 14.2 mm. Under consideration of 5% tolerance, the distance D6 is ranged from 13.49 mm to 14.91 mm. The range of 13.49 mm-14.91 mm belongs to the category of the invention. The second end surface 175 includes an outer edge 1751 and an inner edge 1753. The outer edge 1751 is disposed farther from the erector unit 140 than the inner edge 1753. A second reference point P2 is a middle point of the outer edge 1751. In the invention, a distance D5 from the second reference point P2 to the first central axis C1 is ranged from 12.4 mm to 12.5 mm. Under consideration of 5% tolerance, the distance D5 is ranged from 11.78 mm to 13.125 mm. The range of 11.78 mm-13.125 mm belongs to the category of the invention. A line connecting the second reference point P2 and the second intersection S2 meets the first central axis C1 at an angle A1 that is ranged from 35° to 55°. Under consideration of 5% tolerance, the angle A1 is ranged from 33.25° to 57.75°. The range of 33.25° to 57.75° belongs to the category of the invention. A line connecting the first reference point P1 and the second intersection S2 meets the first central axis C1 at an angle A2 that is ranged from 24° to 35°. Under consideration of 5% tolerance, the angle A2 is ranged from 22.8° to 36.75°. The range of 22.8° to 36.75° belongs to the category of the invention. A line connecting the second reference point P2 and the first intersection S1 meets the first central axis C1 at an angle A3 that is ranged from 24° to 29°. Under consideration of 5% tolerance, the angle A3 is ranged from 22.8° to 30.45°. The range of 22.8° to 30.45° belongs to the category of the invention. A line connecting the first reference point P1 and the first intersection S1 meets the first central axis C1 at an angle A4 that is approximately 60°. Under consideration of 5% tolerance, the angle A4 is ranged from 57° to 63°. The range of 57° to 63° belongs to the category of the invention.

Figure 4C:
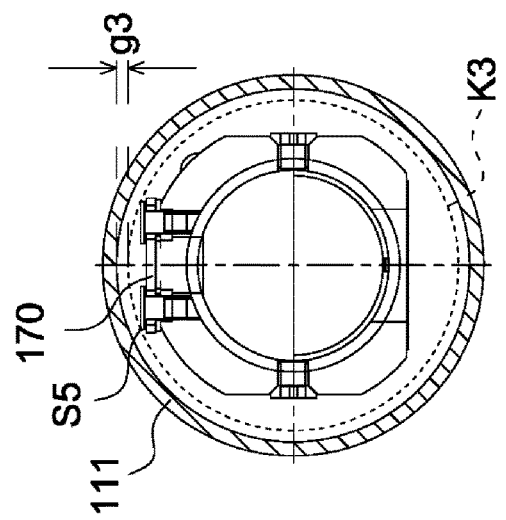
FIG. 4C is a section view of the sight device of FIG. 1 along IVC-IVC.
Figure 4B:
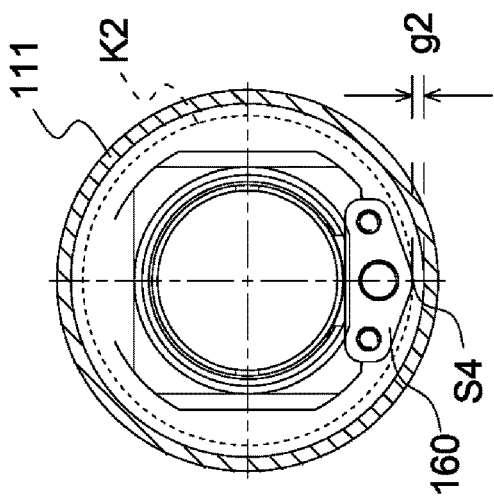
FIG. 4B is a section view of the sight device of FIG. 1 along IVB-IVB.
Figure 4A:
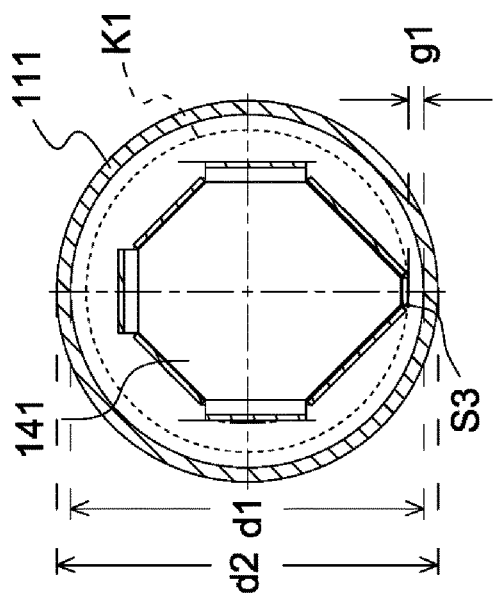
FIG. 4A is a section view of the sight device of FIG. 1 along IVA-IVA.

Referring to FIG. 4A, FIG. 4A is a section view of the sight device of FIG. 1 along IVA-IVA. As shown, the first prism 141 and its circumscribed circle K1 have a third intersection S3. The distance between the third intersection S3 and the housing 110 is the minimum distance between the first prism 141 and the first held portion 111 of the housing 110, indicated by symbol g1 in FIG. 4A. In the invention, the minimum distance g1 between the first prism 141 and the first held portion 111 of the housing 110 is ranged from 1.38 mm to 1.88 mm. Under consideration of 5% tolerance, the minimum distance g1 is ranged from 1.311 mm to 1.974 mm. The inner diameter d1 of the first held portion 111 of the housing 110 of the invention is 31.5 mm. Under consideration of 5% tolerance, the inner diameter d1 is ranged from 29.925 mm to 33.075 mm. The outer diameter d2 of the first held portion 111 of the housing 110 of the invention is 34 mm. Under consideration of 5% tolerance, the outer diameter d2 is ranged from 32.3 mm to 35.7 mm.

Referring to FIG. 4B, FIG. 4B is a section view of the sight device of FIG. 1 along IVB-IVB. As shown, the light emitting unit 160 and its circumscribed circle K2 have a fourth intersection S4. The distance between the fourth intersection S4 and the housing 110 is the minimum distance between the light emitting unit 160 and the first held portion 111 of the housing 110, indicated by symbol g2 in FIG. 4B. In the invention, the minimum distance g2 between the light emitting unit 160 and the first held portion 111 of the housing 110 is ranged from 1.05 mm to 1.55 mm. Under consideration of 5% tolerance, the minimum distance g2 is ranged from 0.9975 mm to 1.6275 mm.

Referring to FIG. 4C, FIG. 4C is a section view of the sight device of FIG. 1 along IVC-IVC. As shown, the light receiving unit 170 and its circumscribed circle K3 have a fifth intersection S5. The distance between the fifth intersection S5 and the housing 110 is the minimum distance between the light receiving unit 170 and the first held portion 111 of the housing 110, indicated by symbol g3 in FIG. 4C. In the invention, the minimum distance g3 between the light receiving unit 170 and the first held portion 111 of the housing 110 is ranged from 1.02 mm to 1.63 mm. Under consideration of 5% tolerance, the minimum distance g3 is ranged from 0.969 mm to 1.7115 mm.

In this embodiment, the sight device 10 further satisfies the following condition:

$$6 \leq D5/g3 \leq 13 \quad (1)$$

$$8 \leq D6/g2 \leq 14 \quad (2)$$

$$4\% \leq |(D5-D6)/d1| \leq 6\% \quad (3)$$

$$4\% \leq |(D5-D6)/d2| \leq 6\% \quad (4)$$

$$2\% \leq g3/d1 \leq 6\% \quad (5)$$

$$2\% \leq g3/d2 \leq 5\% \quad (6)$$

$$2\% \leq g2/d1 \leq 5\% \quad (7)$$

$$2\% \leq g2/d2 \leq 5\% \quad (8)$$

$$3\% \leq g1/d1 \leq 6\% \quad (9)$$

$$3\% \leq g1/d2 \leq 6\% \quad (10)$$

$$0.2 \leq |(A1-A2)/(A3-A4)| \leq 0.6 \quad (11)$$

$$0.8 \leq |(D1-D2)/(D3-D4)| \leq 3 \quad (12)$$

where the symbols A1-A4 and D1-D6 are labeled in FIG. 3, and the symbols d1-d2 and g1-g3 are labeled in FIGS. 4A-4C. The meanings of all the symbols are already described above and therefore are not repeatedly described. It is understood that the sight device may only satisfies a part of above conditions (1)-(12). That also belongs to the category of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sight device, comprising:
   a housing comprising a first end, a second end opposite to the first end, an external surface and a second central axis;
   an objective lens unit disposed at the first end of the housing;
   an ocular lens unit disposed at the second end of the housing and opposite to the objective lens unit;
   an erector unit disposed between the objective lens unit and the ocular lens unit;
   an adjusting unit movably disposed on the housing and radially propped against the erector unit to adjust the erector unit;
   a light emitting unit which is disposed on the erector unit and comprises a light source for emitting a light beam to an object;
   a light receiving unit which is disposed on the erector unit and comprises a light sensor for receiving the light beam reflected by the object;
   wherein, in any cross section of the housing, any point on the external surface of the housing is approximately equally distant from the second central axis;
   wherein the sight device satisfies at least one of following conditions:

$$6 \leq D5/93 \leq 13,$$

$$8 \leq D6/92 \leq 14,$$

$$4\% \leq |(D5-D6)/d1| \leq 6\%,$$

$$4\% \leq |(D5-D6)/d2| \leq 6\%,$$

$$0.8 \leq |(D1-D2)/(D3-D4)| \leq 3,$$

$0.2 \leq |(A1-A2)/(A3-A4)| \leq 0.6$, $3\% \leq g1/d1 \leq 6\%$, $3\% \leq g1/d2 \leq 6\%$, $2\% \leq g2/d1 \leq 5\%$, $2\% \leq g2/d2 \leq 5\%$, $2\% \leq g3/d1 \leq 6\%$, $2\% \leq g3/d2 \leq 5\%$, where D5 is a distance from a second reference point to a first central axis, g3 is a minimum distance from the light receiving unit to a first held portion, D6 is a distance from a first reference point to the first central axis, g2 is a minimum distance from the light emitting unit to the first held portion, d1 is an inner diameter of the first held portion, d2 is an outer diameter of the first held portion, D1 is a distance between a first end surface and a third side surface, D2 is a distance between a second end surface and the third side surface, D3 is a distance between a first side surface and the third side surface, D4 is a distance between a second side surface and the third side surface, A1 is an angle at which a first line connecting the second reference point and a second intersection meets the first central axis, A2 is an angle at which a second line connecting the first reference point and the second intersection meets the first central axis, A3 is an angle at which a third line connecting the second reference point and a first intersection meets the first central axis, A4 is an angle at which a fourth line connecting the first reference point and the first intersection, g1 is a minimum distance between a first prism and the first held portion, d1 is the inner diameter of the first held portion, d2 is the outer diameter of the first held portion, g2 is a minimum distance between the light emitting unit and the first held portion, g3 is a minimum distance between the light receiving unit and the first held portion, wherein the second end surface comprises an outer edge and a middle point of the outer edge is the second reference point, wherein the housing further comprises the first held portion, wherein the erector unit comprises the first central axis, wherein the light emitting unit further comprises the first end surface disposed towards the objective lens unit, wherein the first held portion is hollow and cylindrical and comprises the inner diameter and the outer diameter, wherein the erector unit comprises the first prism and a second prism, wherein the light emitting unit further comprises the first end surface disposed towards the objective lens unit, wherein the light receiving unit further comprises the second end surface disposed towards the objective lens unit, wherein the second prism comprises the third side surface disposed towards the ocular lens unit, and a fourth side surface disposed towards the objective lens unit, wherein the first prism comprises the first side surface disposed towards the ocular lens unit, and the second side surface disposed towards the objective lens unit, wherein the first end surface comprises a plurality of points among which the first reference point is disposed farthest from the first central axis, wherein the second end surface comprises an outer edge and an inner edge disposed closer to the erector unit than the outer edge, wherein a middle point of the outer edge is the second reference point, and wherein the first central axis intersects the second side surface at the first intersection and intersects the third side surface at the second intersection.

2. The sight device as claimed in claim 1, wherein:
the housing further comprises a second held portion, and the first held portion and the second held portion are disposed at both sides of a location where the adjusting unit is connected to the housing;
the second held portion are hollow and cylindrical;
a ratio of a length of the first held portion to that of the second held portion is ranged from 0.5 to 2.

3. The sight device as claimed in claim 1, wherein:
the housing further comprises an internal surface;
in any cross section of the housing, any point on the internal surface of the housing is approximately equally distant from the second central axis.

4. The sight device as claimed in claim 3, wherein:
the housing further comprises a second held portion, and the first held portion and the second held portion are disposed at both sides of a location where the adjusting unit is connected to the housing;
the second held portion are hollow and cylindrical;
the first held portion comprises a first inner diameter and a first outer diameter;
the second portion comprises a second inner diameter and a second outer diameter;
a ratio of the first inner diameter of the first held portion to the second inner diameter of the second held portion is ranged from 0.95 to 1.05;
a ratio of the first outer diameter of the first held portion to the second outer diameter of the second held portion is ranged from 0.95 to 1.05.

5. The sight device as claimed in claim 1, wherein:
when observed along the first central axis, the light source and the light sensor coincide with each other.

6. The sight device as claimed in claim 1, wherein:
when observed along the first central axis, the light source and the light sensor are arranged to have an included angle of 180° with respect to the first central axis.

7. The sight device as claimed in claim 1, wherein:
the first prism is disposed closer to the objective lens unit than the second prism.

8. The sight device as claimed in claim 1, wherein:
the first prism is disposed closer to the objective lens unit than the light emitting unit.

9. A sight device, comprising:
a housing comprising a first end, a second end opposite to the first end, an internal surface and a second central axis;
an objective lens unit disposed at the first end of the housing;
an ocular lens unit disposed at the second end of the housing and opposite to the objective lens unit;
an erector unit disposed between the objective lens unit and the ocular lens unit;
an adjusting unit movably disposed on the housing and radially propped against the erector unit to adjust the erector unit;
a light emitting unit which is disposed on the erector unit and comprises a light source for emitting a light beam to an object;
a light receiving unit which is disposed on the erector unit and comprises a light sensor for receiving the light beam reflected by the object;

wherein, in any cross section of the housing, any point on the internal surface of the housing is approximately equally distant from the second central axis;

wherein the sight device satisfies at least one of following conditions:

$6 \leq D5/93 \leq 13$, $8 \leq D6/g2 \leq 14$, $4\% \leq |(D5-D6)/d1| \leq 6\%$, $4\% \leq |(D5-D6)/d2| \leq 6\%$, $0.8 \leq |(D1-D2)/(D3-D4)| \leq 3$, $0.2 \leq |(A1-A2)/(A3-A4)| \leq 0.6$, $3\% \leq g1/d1 \leq 6\%$, $3\% \leq g1/d2 \leq 6\%$, $2\% \leq g2/d1 \leq 5\%$, $2\% \leq g2/d2 \leq 5\%$, $2\% \leq g3/d1 \leq 6\%$, $2\% \leq g3/d2 \leq 5\%$, where D5 is a distance from a second reference point to a first central axis, g3 is a minimum distance from the light receiving unit to a first held portion, D6 is a distance from a first reference point to the first central axis, g2 is a minimum distance from the light emitting unit to the first held portion, d1 is an inner diameter of the first held portion, d2 is an outer diameter of the first held portion, D1 is a distance between a first end surface and a third side surface, D2 is a distance between a second end surface and the third side surface, D3 is a distance between a first side surface and the third side surface, D4 is a distance between a second side surface and the third side surface, A1 is an angle at which a first line connecting the second reference point and a second intersection meets the first central axis, A2 is an angle at which a second line connecting the first reference point and the second intersection meets the first central axis, A3 is an angle at which a third line connecting the second reference point and a first intersection meets the first central axis, A4 is an angle at which a fourth line connecting the first reference point and the first intersection, g1 is a minimum distance between a first prism and the first held portion, d1 is the inner diameter of the first held portion, d2 is the outer diameter of the first held portion, g2 is a minimum distance between the light emitting unit and the first held portion, g3 is a minimum distance between the light receiving unit and the first held portion, wherein the second end surface comprises an outer edge and a middle point of the outer edge is the second reference point, wherein the housing further comprises the first held portion, wherein the erector unit comprises the first central axis, wherein the light emitting unit further comprises the first end surface disposed towards the objective lens unit, wherein the first held portion is hollow and cylindrical and comprises the inner diameter and the outer diameter, wherein the erector unit comprises the first prism and a second prism, wherein the light emitting unit further comprises the first end surface disposed towards the objective lens unit, wherein the light receiving unit further comprises the second end surface disposed towards the objective lens unit, wherein the second prism comprises the third side surface disposed towards the ocular lens unit, and a fourth side surface disposed towards the objective lens unit, wherein the first prism comprises the first side surface disposed towards the ocular lens unit, and the second side surface disposed towards the objective lens unit, wherein the first end surface comprises a plurality of points among which the first reference point is disposed farthest from the first central axis, wherein the second end surface comprises an outer edge and an inner edge disposed closer to the erector unit than the outer edge, wherein a middle point of the outer edge is the second reference point, and wherein the first central axis intersects the second side surface at the first intersection and intersects the third side surface at the second intersection.

10. The sight device as claimed in claim 9, wherein:
the housing further comprises a second held portion, and the first held portion and the second held portion are disposed at both sides of a location where the adjusting unit is connected to the housing;
the second held portion are hollow and cylindrical;
a ratio of a length of the first held portion to that of the second held portion is ranged from 0.5 to 2.

11. The sight device as claimed in claim 9, wherein:
when observed along the first central axis, the light source and the light sensor coincide with each other.

12. The sight device as claimed in claim 9, wherein:
when observed along the first central axis, the light source and the light sensor are arranged to have an included angle of 180° with respect to the first central axis.

13. The sight device as claimed in claim 9, wherein:
the first prism is disposed closer to the objective lens unit than the second prism.

14. The sight device as claimed in claim 9, wherein:
the first prism is disposed closer to the objective lens unit than the light emitting unit.

* * * * *